(No Model.)
W. R. PATTERSON.
MANUFACTURE OF TELEGRAPH CABLES.
No. 356,206. Patented Jan. 18, 1887.
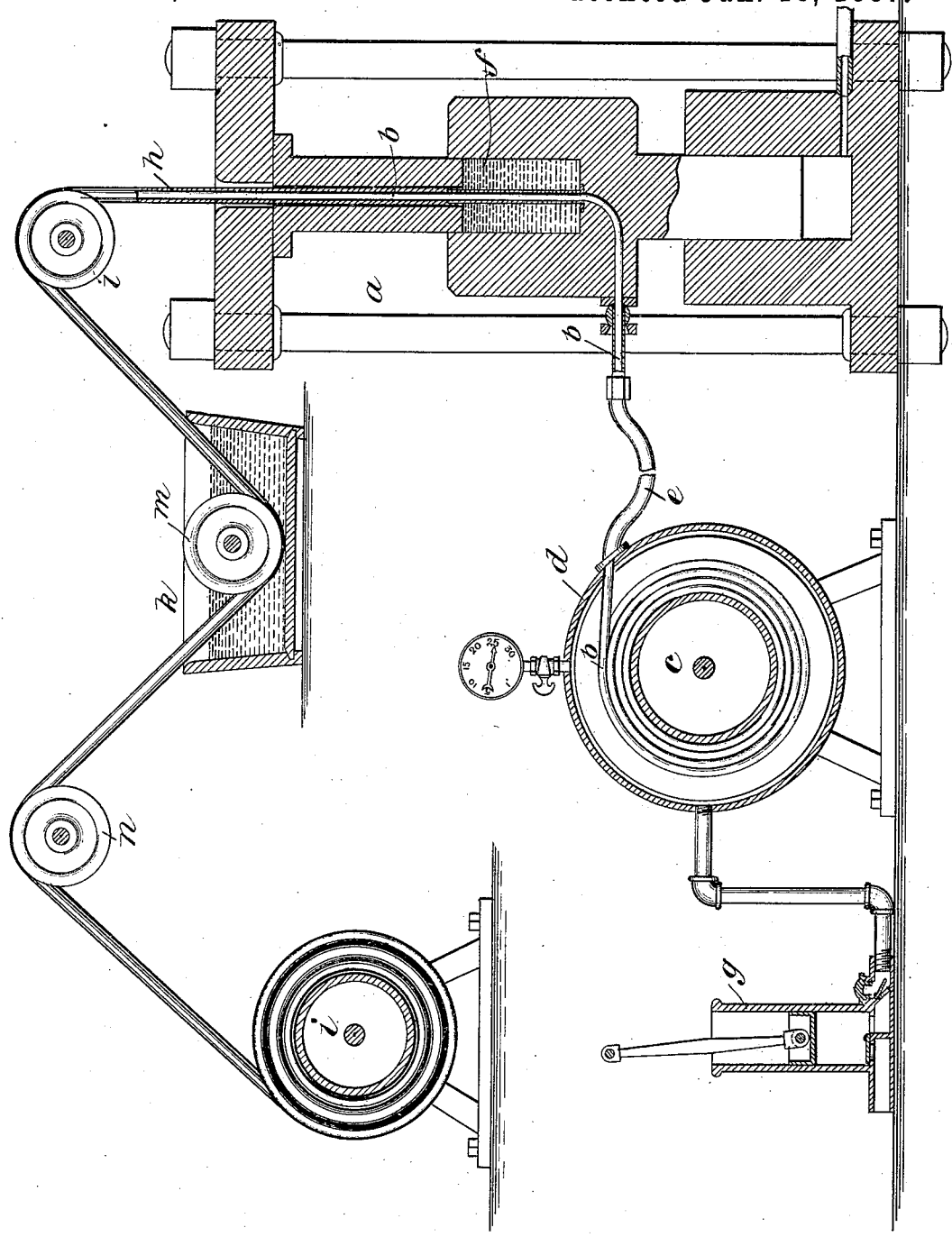
Witnesses
Saml. B. Dover.
L. Panier
Inventor:
William R. Patterson
By George H. Barton
his Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

MANUFACTURE OF TELEGRAPH-CABLES.

SPECIFICATION forming part of Letters Patent No. 356,206, dated January 18, 1887.

Application filed July 2, 1886. Serial No. 206,987. (No model.)

*To all whom it may concern:*

Be it known that I, WILLIAM R. PATTERSON, a citizen of the United States, residing at Chicago, in the county of Cook and State of Illinois, have invented a certain new and useful Improvement in the Manufacture of Telegraph-Cables, (Case 60,) of which the following is a full, clear, concise, and exact description, reference being had to the accompanying drawing, forming a part of this specification.

My invention relates to the manufacture of telegraph-cables; and its object is to test the lead pipe as it is being formed over the core, so as to discover any flaws or imperfection in the pipe.

My invention consists, broadly, in subjecting the lead pipe as it is formed over the core of insulated conductors to pneumatic pressure. While the pipe is thus subjected to pneumatic pressure, I preferably bend the pipe in different directions. I have found it desirable to run the pipe at the same time under some insulating-liquid, in order that any air or gas which is forced by pressure through a defective place in the pipe may be seen in the form of bubbles upon the liquid. Water as a liquid would be objectionable, since in case of a leak in the pipe the water would penetrate to the core and impair the insulation. Ordinarily the air escaping through a break or puncture in the pipe would be detected by the sound. I prefer, however, to run the pipe under a liquid, in order that the smallest escape of air or other gas, and consequently the slightest crack or puncture in the pipe, may be detected. I preferably arrange the sheaves or other devices for bending the pipe so that the pipe will be bent in one direction at least under the liquid.

My method of testing the lead pipe of telegraph-cables will be readily understood by reference to the accompanying drawing, which illustrates apparatus which I have found sufficient for doing the work.

The hydraulic press $a$ may be of any well-known construction. The core $b$, which is to be covered, is unwound from a reel or drum, $c$. This drum, containing the core, is inclosed in an air-tight chamber, $d$. A flexible air-tight tube, $e$, is connected with suitable couplings between the chamber and the hydraulic press, and the core, as it is drawn off from the reel, passes through this flexible tube, as shown, to the hollow mandrel. The bore of the mandrel should be somewhat larger than the core. The lead from which the pipe is formed is turned into the receptacle about the mandrel, as indicated at $f$. I have shown an air-pump, $g$, for forcing the air into the air-tight chamber to produce the required amount of pneumatic pressure. Instead of the air pump I might use any other suitable device for forcing air or gas into the chamber. For example, I might use a carbonic-acid-gas generator. The lead pipe first formed is bent or pounded down over the end of the core and against the side of the core, so as to prevent the escape of the air. The core and lead pipe being thus secured together, it is evident that as the lead pipe is formed the core will be carried along and unwound from the reel at the desired rate of speed. I have found that a pressure equal to an atmosphere of fifteen pounds to the square inch is sufficient for the purposes of my invention.

For clearness I have shown the lead pipe $h$ thicker than is ordinarily required for telegraph-cables. As the pipe surrounding the core is delivered from the press it is taken up by a suitable reel, $i$.

The vat $k$, containing the insulating-liquid, is placed between the reel $i$ and the press, and by means of the sheaves $l\ m\ n$ the cable is bent so as to pass under the liquid and be received upon the reel. The sheave $n$ might be omitted, in which case the reel $i$ would be placed so as to receive the cable directly from the liquid.

My method may be successfully employed without bending the cable or running the cable under liquid, in which case the reel $i$ would be placed so as to receive the cable directly from the press. After the reel $i$ is full it is placed in an oven, and the space remaining within the pipe about the core is filled with an insulating material in any suitable manner. I preferably use paraffine, which is forced in hot, mingled with gas under pressure, according to my well-known patented method.

Having thus described my invention, I claim as new and desire to secure by Letters Patent—

1. The method of testing the lead pipe of telegraph-cables, which consists in subjecting the interior of the pipe to pneumatic pressure as it is being formed over the core, whereby any cracks or punctures in the pipe are detected by the escape of the air or gas.

2. The method of testing lead pipe of telegraph-cables, which consists in subjecting the interior of the pipe to pneumatic pressure as it is being formed over the core, and at the same time bending the pipe under a liquid, whereby any defects in the pipe are detected by the air or gas escaping and rising in bubbles upon the liquid.

In witness whereof I hereunto subscribe my name this 15th day of June, A. D. 1886.

WILLIAM R. PATTERSON.

Witnesses:
GEORGE P. BARTON,
BERTRAND C. YEATON.